United States Patent
Peñaranda et al.

(10) Patent No.: US 6,811,298 B2
(45) Date of Patent: Nov. 2, 2004

(54) COUPLING DEVICE FOR AN APPLIANCE FOR DOMESTIC USE

(75) Inventors: Mariano Peñaranda, Barcelona (ES); Josep-Maria Masip, Barcelona (ES)

(73) Assignee: Braun GmbH, Kronberg (DE)

( * ) Notice: Subject to any disclaimer, the term of this patent is extended or adjusted under 35 U.S.C. 154(b) by 52 days.

(21) Appl. No.: 10/240,350

(22) PCT Filed: Apr. 27, 2001

(86) PCT No.: PCT/EP01/04757
§ 371 (c)(1),
(2), (4) Date: Oct. 1, 2002

(87) PCT Pub. No.: WO01/84996
PCT Pub. Date: Nov. 15, 2001

(65) Prior Publication Data
US 2003/0156899 A1 Aug. 21, 2003

(30) Foreign Application Priority Data
May 6, 2000 (DE) ............. 100 22 131

(51) Int. Cl.[7] ............................................. A47J 43/07
(52) U.S. Cl. .................... 366/129; 366/344; 403/325
(58) Field of Search ................ 366/129, 331, 366/344; 99/348; 403/321–330, 373, 374.1

(56) References Cited

U.S. PATENT DOCUMENTS

| 2,865,662 | A | * | 12/1958 | Nurmse ................. 403/325 |
| 3,299,924 | A | * | 1/1967 | Hanschitz .............. 366/129 |
| 4,405,998 | A | * | 9/1983 | Brison ................... 366/129 |
| 4,850,699 | A | * | 7/1989 | Rebordosa ............. 366/129 |
| 4,954,004 | A | * | 9/1990 | Faber et al. |
| 5,368,384 | A | * | 11/1994 | Duncan et al. ........ 366/129 |
| 5,567,017 | A | * | 10/1996 | Bourgeois et al. |
| 5,567,047 | A | * | 10/1996 | Fritsch |
| 5,810,472 | A | * | 9/1998 | Penaranda et al. ..... 366/129 |
| 5,863,118 | A | * | 1/1999 | Ackels et al. .......... 366/129 |
| 6,193,404 | B1 | * | 2/2001 | Calange ................. 366/331 |
| 6,523,990 | B1 | * | 2/2003 | Lee ......................... 99/348 |
| 2002/0136086 | A1 | * | 9/2002 | Gili et al. .............. 366/129 |

FOREIGN PATENT DOCUMENTS

| DE | 3307023 A1 | * | 8/1984 |
| DE | 20006028 U1 | * | 8/2000 |
| DE | 10002935 A1 | * | 10/2001 |
| EP | 0 692 215 A1 | | 1/1996 |
| FR | 1 467 108 | | 4/1967 |
| FR | 2770121 | * | 4/1999 |
| FR | 2794017 | * | 12/2000 |

* cited by examiner

Primary Examiner—Charles E. Cooley
(74) Attorney, Agent, or Firm—Fish & Richardson P.C.

(57) ABSTRACT

The invention is directed to a coupling device for an appliance for domestic use, in particular a handheld blender, for connecting a drive part to a tool shank, with a locking device having locking elements being arranged on a coupling section of the drive part, said locking elements being in engagement with depressions formed on the inner circumference of the tool shank in the locked state. The invention is characterized in that the locking device is constructed as an annular spring element and that in the area of the locking element provision is made for an actuating device causing, when actuated, the spring element to be deformed elastically such that the locking element moves inwardly, hence becoming disengaged from the detent element.

13 Claims, 5 Drawing Sheets

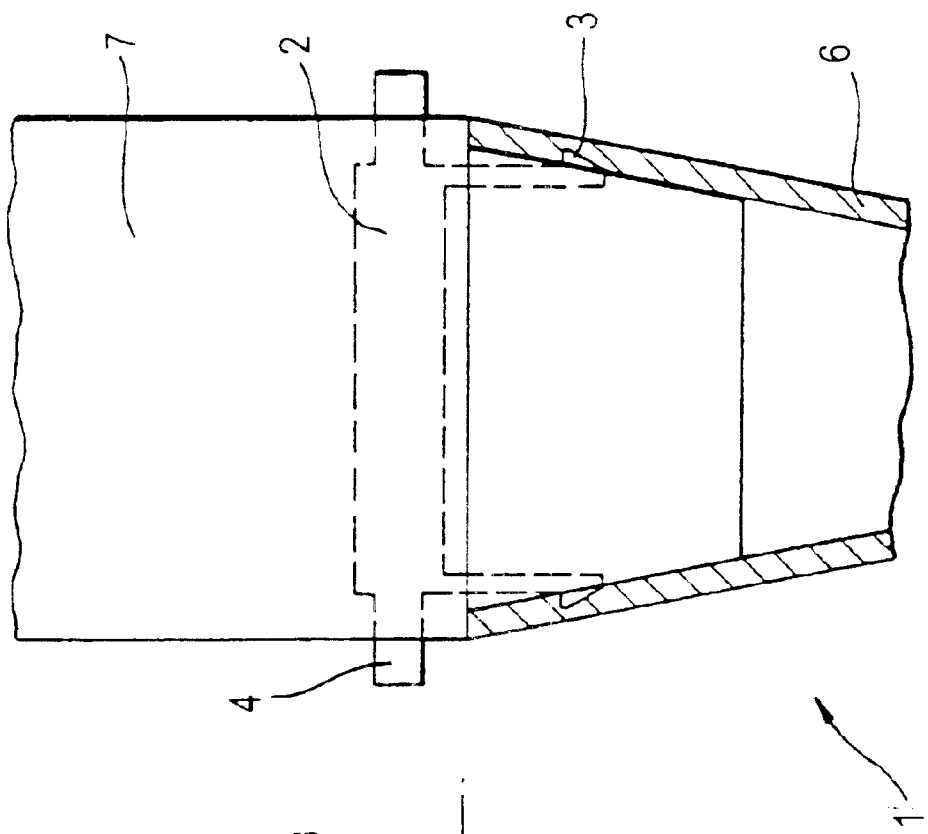
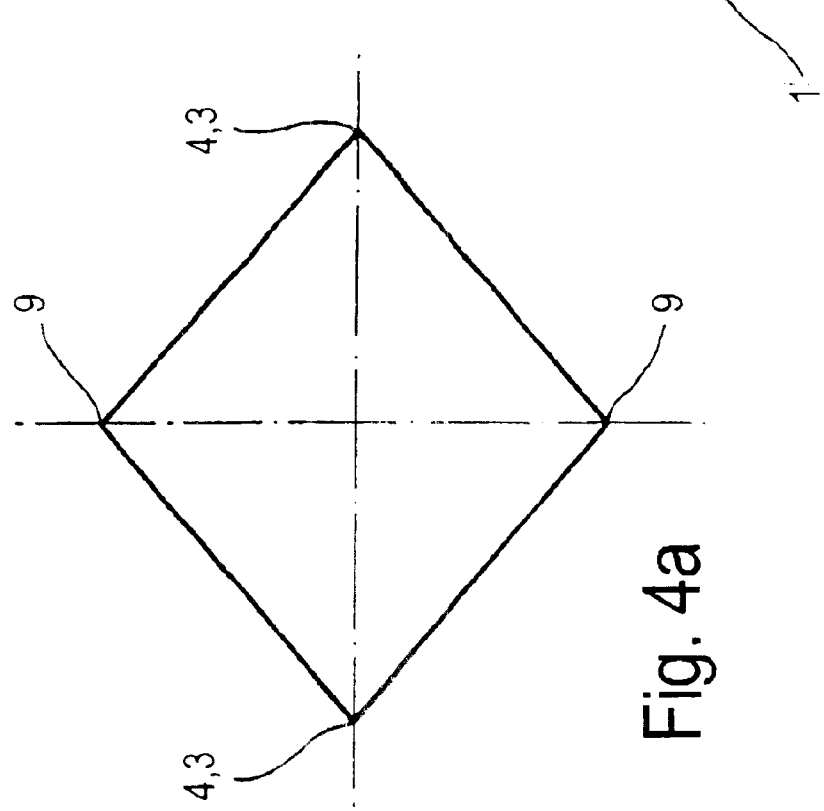

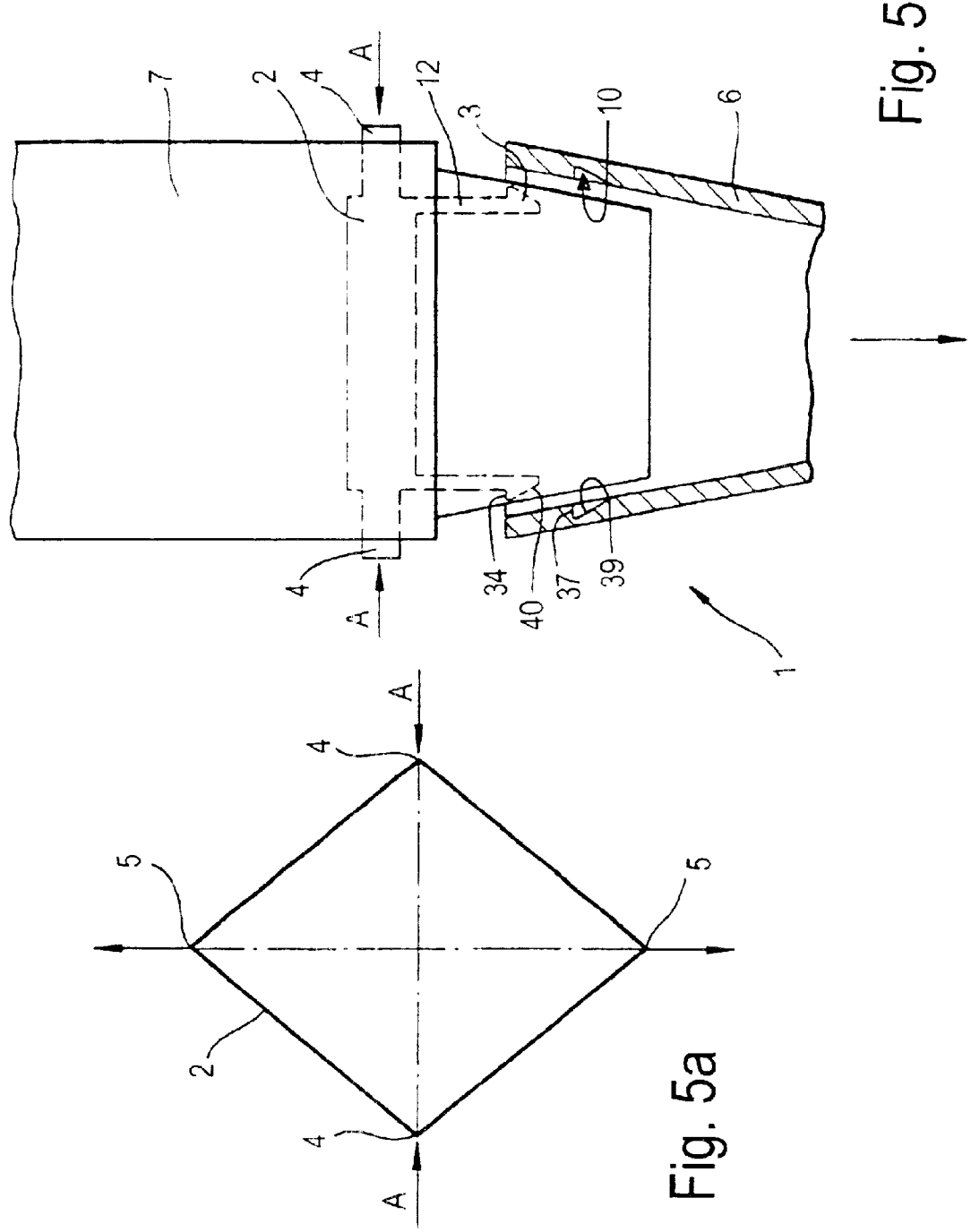

COUPLING DEVICE FOR AN APPLIANCE FOR DOMESTIC USE

TECHNICAL FIELD

This invention relates to a coupling device for an appliance for domestic use.

BACKGROUND OF THE INVENTION

Coupling devices of this type for kitchen machines are known from the art. For example, FR 1467108 describes a device in which a socket arranged on a tool shank hooks elastically into the lower region of the drive part. For this to happen the drive part has at its lower end a latch which, under the action of a helical spring, engages radially in a groove provided on the outer circumference of the socket. In this arrangement the latch can be released by an actuating button which in the latched position projects sideways out of the drive part.

From FR 1467108 there is also known an ejecting device which is integrated in the drive part. According to this prior art, a helical spring is biased when the tool shank is pushed in and used as an ejector when released.

Furthermore, from EP 0692215 A1 there is known a handheld blender with a drive part and an interchangeable tool shank in which a tool shaft is rotatably mounted. To fasten the tool shank to the drive part an expansion clamp of the drive part engages in a mounting groove of the tool shank. To release the tool shank the expansion clamp, which is constructed as a metal spring, is pushed by means of a pushbutton, which is constructed as a separate component, in the direction of an opposite lying pushbutton.

SUMMARY OF THE INVENTION

It is an object of the present invention to provide a simple and low-cost solution for connecting a tool shank to the drive part of an appliance for domestic use, particularly a handheld blender or immersion blender.

In general, in one aspect there is a coupling device with a locking device having at least one locking element being arranged on a coupling section of a drive part. In a locked state, the locking element engages with a detent element of a tool shank. The locking device is constructed as an annular spring element and in the area of each locking element provision is made for an actuating device. When actuated, the actuating device causes the spring element to be deformed elastically such that the locking element becomes disengaged from the detent element. A particularly simple coupling device affording low-cost manufacture is provided by the construction of the invention. The device of the present invention may find application not only on handheld blenders such as immersion blenders but also on stand-alone kitchen machines or other electrical appliances for domestic use. The coupling section of the drive part may be constructed, for example, essentially as a cylindrical end portion having arranged in its interior the locking device. The upper part of the tool shank is likewise of an essentially cylindrical configuration at its inner circumference enabling it to slide over the coupling section of the drive part quasi like a sleeve to be centered and axially fixed in place on the cylindrical end portion. Furthermore, rotatably mounted in the tool shank is a tool shaft whose one end is adapted to be coupled with the drive shaft of the drive part and whose other end projects into the blending space of a bell-shaped shield and is securely connected to a processing blade, such as was initially referred to in the prior art.

It will be understood, of course, that other annular configurations of the spring element, e.g., circular, prismatic, elliptical or other forms of ring, are also possible. With these configurations the upper part of the tool shank, which is constructed essentially as a sleeve, is shaped to conform to the shape of the coupling section of the drive part in order to be able to plug these parts together. The detent element, which here is constructed preferably as a depression provided on the inner circumference of the tool shank, may be constructed as a circumferential groove, for example, or as a single elongated slot. In the event of the locking device being constructed as an ellipse, the points furthest apart from each other lie on the long diameter of the ellipse. If the spring element is shaped as a rhombus, the points furthest apart from each other lie on the long diagonal.

The locking element may be formed by a projecting lug or a bead or a depression, for example, which is integrally connected as a one-piece construction with the spring element and then engages in a corresponding depression or lug or other projection on the tool shank. The actuating device involved may be a bead which is formed on the spring element and has the function of a pushbutton. A multiple function results from the fact that both the actuating device and the locking element are integrally connected as one piece with the spring element, thereby reducing the number of additional components and having the actuating and locking function performed by a single component.

Through the superimposed arrangement of the actuating device and the locking element the locking element is displaced radially inwardly when the spring element on the actuating device is pressed, as the result of which it slides out of the detent element, thus releasing the tool shank for removal. According to the invention the actuating element may simultaneously form the locking element as well. According to the invention the spring element is deformed by the actuating element being pressed on the one side while the spring element takes support upon the housing of the drive part on the other side.

By virtue of the diametric arrangement of the locking and actuating elements of some embodiments, it is possible to press together the spring element in simple manner and with little force using the thumb and index finger of one hand, as the result of which the locking elements move likewise in inward direction. When released, the spring element and the locking elements return to their initial position.

In some embodiments, provision is made for at least one opening on the outer wall of the coupling section of the drive part. The openings for the actuating elements may be elongated or oval slots or, alternatively, openings shaped in a rectangular, circular or some other configuration. In the locked state the actuating elements project out through these openings and are therefore freely accessible from the outside for actuation. When actuated by hand the actuating elements partly disappear in the openings of the outer wall of the coupling section of the outer part, as the result of which the locking elements also move inwardly and slide out of their detent elements, as the result of which the tool shank is in turn released and allowed to slide downward from the coupling section and drive part.

In some cases, actuating devices are diametrically opposed on the spring element projecting outwardly through the openings provided on the drive part, making it possible for the spring element to be actuated particularly effectively and easily from the outside, because the spring element is essentially symmetric in construction and pressed together uniformly from both sides when force is applied.

In some embodiments, the superimposed arrangement of the locking element and the actuating device results in the path traveled on the actuating device being equal to the path traveled on the locking element, i.e., a direct transmission of travel results with minimum actuating forces and displacement travels, leading ultimately to a simple and direct unlocking operation of the coupling device.

In another aspect, the locking device can be fabricated from a suitable thermoplastic material. Suitable materials to be considered include, for example, elastic polypropylene, polyethylene or polyamide. These materials can be used for injection-molded parts in a simple and low-cost manner. The inherent elasticity of these plastics guarantees that the spring element recovers its original form after being accordingly deformed as required. Furthermore, a multiplicity of functions can be performed by a single component through its construction as a one-piece plastic part.

In yet another aspect, the locking device can include at least one ejector disposed in a 90-degree offset relation to the locking element. Furthermore, the functions of the ejector and the locking elements are skillfully interconnected because the ejector is arranged at an angle of 90 degrees to the locking elements in the case of a spring element of cylindrical configuration, on the short diameter in the case of a spring element of elliptical configuration, and on the short diagonal in the case of a spring element of rhombic configuration. When the locking device is accordingly actuated by means of the actuating elements the spring element is deformed for the releasing operation, thus enlarging the regions of the spring ring around the ejectors or the lengths of the short diagonals or short diameters whilst compressing the actuating region of the spring element. The ejectors are thereby pressed against the obliquely extending inner circumference of the tool shank, as the result of which the locking elements are unlocked and the tool shank simultaneously decoupled from the drive part, pushed away and thereby ejected axially in the longitudinal direction of the drive part.

Some embodiments include ejectors diametrically opposed on the spring element. The ejectors can have ramp surfaces which, when actuated radially, effect an axial ejecting movement in the longitudinal direction of the drive part. A flat ramp pitch is selected so that the actuating forces are not too high for the operator but the travel is still sufficient for the tool shank to be visibly disengaged from the drive part.

In yet another embodiment, provision is made on the locking device and in the coupling section of the drive part for corresponding guide devices that guide the spring element radially towards the drive part. Suitable guide devices, which may be formed, for example, by grooves provided on the spring element and guide ribs on the drive part, are used to prevent the spring element from skewing, for example, thus ensuring a reliable function.

In another aspect, the locking device includes a captivating device comprised of the ejector formed on the spring element, wherein the ejector engages within a passage formed on the drive part. A captivating device of this type may be provided, for example, by having either the ejectors or the locking elements—preferably the ejectors in the embodiment—always engaged with the passages formed on the drive part. Fixing the spring element in the drive part in this manner facilitates the assembly operation significantly because, once installed, the spring element is fixed in its position. Slipping out of the predefined position and jamming with other components is thereby prevented. The ejectors penetrate the drive part and project out of it far enough in radial direction as to latchingly engage in depressions formed on the tool shank in order to act as detent elements when the tool shank is inserted.

In some embodiments, the locking elements are arranged on first connecting bars integrally connected with the spring element. It is thereby possible for the locking elements to snap in place during the coupling operation, without the actuating devices being in the way. This is achieved by spatial separation of the locking elements relative to the actuating devices. When mounting the tool shank it is thus possible for the locking elements to be pressed, without actuating the actuating device, back into the corresponding opening in the outer wall of the coupling section until they are aligned with the depressions on the inner circumference of the tool shank. At this moment the locking elements snap back on account of the spring action of the vertical connecting bar. The coupling connection is now engaged and locked. Unlocking is now only possible by actuating the actuating devices.

To improve the snap-action effect of the locking elements, the locking elements can be constructed in a wedge-shaped configuration, with the detent elements in the form of depressions whose horizontally extending walls abut against abutment surfaces on the locking elements and whose obliquely outwardly extending centering surfaces abut against sliding surfaces on the locking elements shaped to conform to the shape of the centering surfaces of the detent elements. On the one hand the locking elements thus act as a barb, on the other hand the centering surfaces on the tool shank cooperate with the sliding surfaces on the spring element, resulting in the spring element invariably urging the tool shank into the drive part without play, as the result of which the walls are biased against the abutment surfaces because the spring element in the drive part always maintains a small bias.

In some cases, the ejectors are arranged on second connecting bars which are integrally formed with the spring element. In the cases, the tool shank can slide on the wedge-shaped ejector as on a ramp during the decoupling operation. The additional spring action through the second connecting bars helps to control the ejection pressure. It also prevents skewing.

BRIEF DESCRIPTION OF THE DRAWINGS

Further aspects and advantages of the present invention will be explained by the following description of embodiments with reference to the accompanying drawings. In the drawings.

FIG. 4 and FIG. 4a are schematic representations of the function of the invention embodiment of FIG. 1 in locked condition; and FIG. 5 and FIG. 5a are schematic representations of the function of the invention embodiment of FIG. 1 in unlocked condition.

DESCRIPTION OF THE PREFERRED EMBODIMENTS

Figure 1:
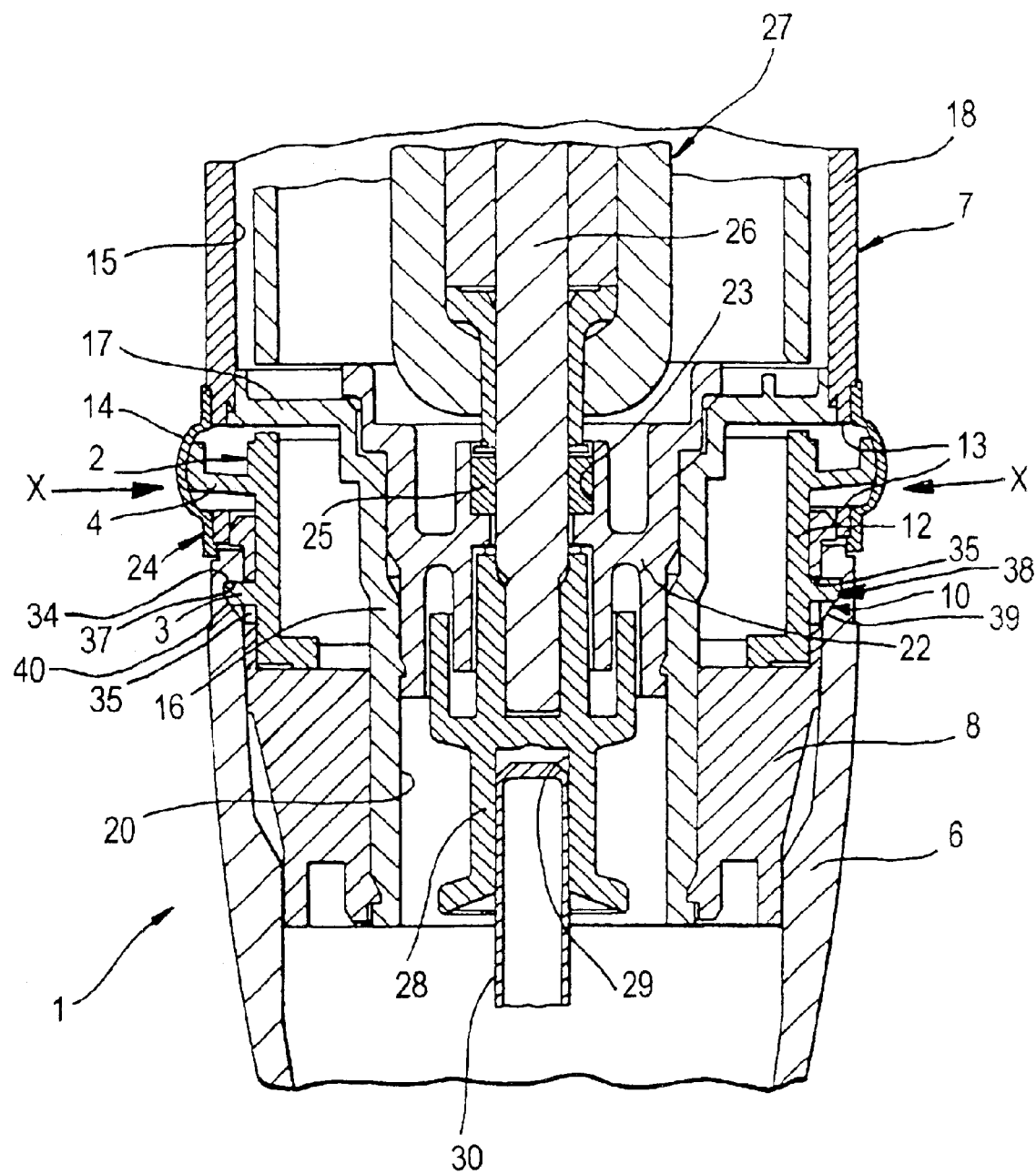
FIG. 1 is a schematic representation showing in a partial longitudinal sectional view an invention embodiment of a coupling device for an immersion blender.
Figure 2:
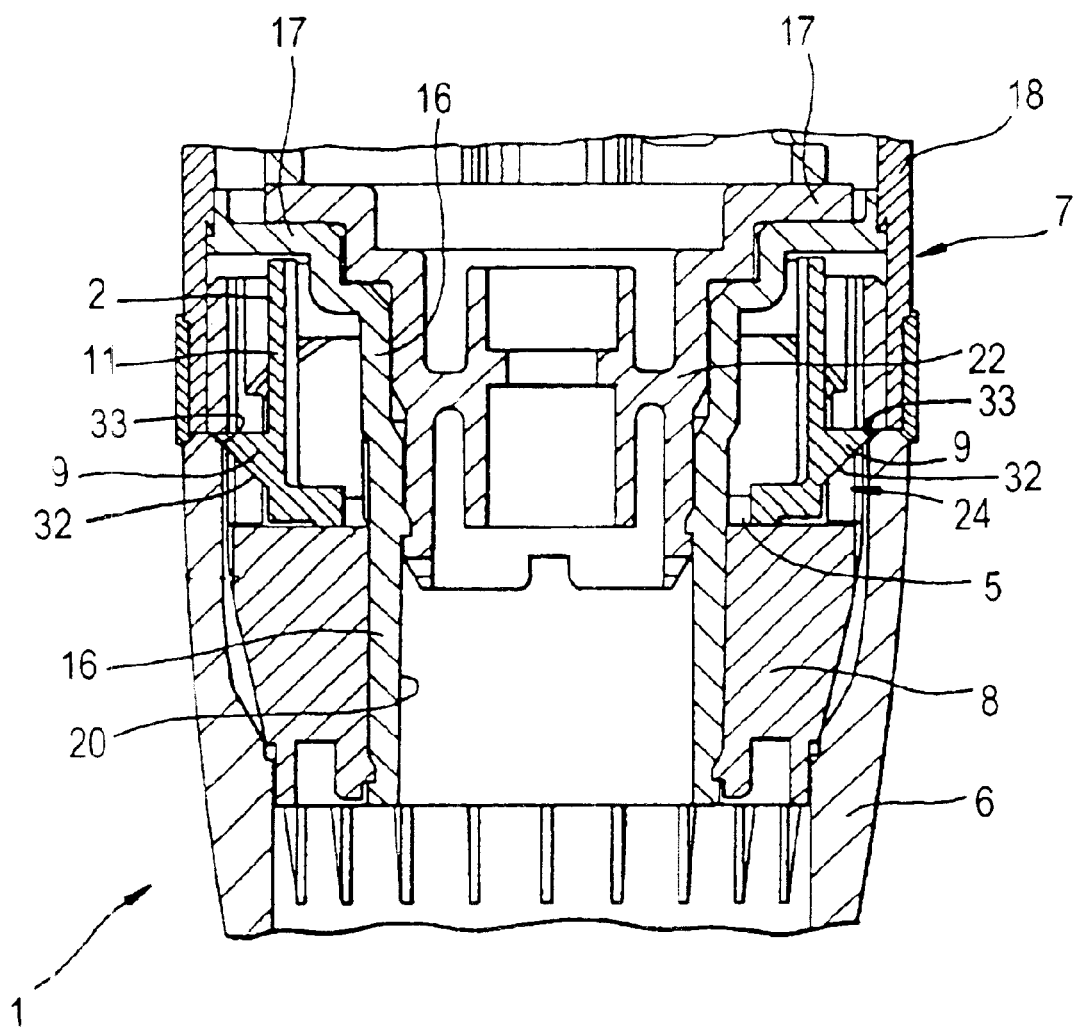
FIG. 2 is a sectional view of the invention embodiment of FIG. 1 turned through 90 degrees, but without motor, drive spindle, coupling sleeve and drive shaft.

FIGS. 1 and 2 show a schematic sectional view of an advantageous embodiment of the coupling device 1 of the invention. They show the tool shank 6 with its upper portion which embraces the lower frusto-conical coupling section 24 of the drive part 7 quasi like a sleeve. In the present embodiment the drive part 7 and the tool shank 6 are manufactured mainly of plastic. As shown in FIG. 1 the tool shank 6 has at its upper inner circumference locking recesses or detent elements 10 which are constructed as elongated grooves for accommodating locking elements 3. Fastened in a bore 15 of the drive part 7 is a bearing sleeve 16 having a bore 20 in which a further bearing sleeve 22 is fastened, which again has a bore 23 in which a plain bearing 25 is inserted, in which is rotatably mounted the drive spindle 26 of the electric motor 27 non-rotatably mounted in the drive part 7. The free end of the drive spindle 26 is non-rotatably fastened to a coupling sleeve 28 which has an accommodating bore 29 in which the drive shaft 30, which is non-rotatably and releasably mounted in the tool shank 6, is non-rotatably and releasably coupled. Fastened to the other end, not shown in the drawings, of the tool shaft is a blade or processing tool (not shown) for processing food, which is surrounded by a shield, preferably a bell, of the type known from FR-B-1467108, for example.

The drive shaft 30 has driving elements, not shown in the drawings, which engage in corresponding driving elements (not shown) in the accommodating bore 29 in a non-rotatable but releasable relationship. According to FIG. 1 the bearing sleeve 16 has an annular collar 17 with 90° offset, which takes support upon and centers itself on the bore 15 of the housing 18 at the drive end.

FIG. 1 also shows in section the spring element 2 made of elastic plastic. The spring element 2 is shaped in a rhombic configuration having radiused corners. FIG. 1 shows the corner points on the long diagonal. The plane formed by the rhombic spring element 2 is referred to in the following as the spring element plane.

Also shown in FIG. 1 are two opposing locking elements 3 connected in one integral piece with connecting bars 12. In this arrangement the locking elements 3 are of a wedge-shaped configuration abutting with their abutment surface 34 against the horizontally extending wall 37 of the detent elements 10 constructed as blind-end bores or depressions, after they were pushed by the radial bias exerted by the spring element 2 upward as far as the stop via cooperating sliding and centering surfaces 40, 39. In this position, as in the decoupled position, the locking elements 3 penetrate the passages 35 and engage in the undercut detent elements 10.

Figure 3:
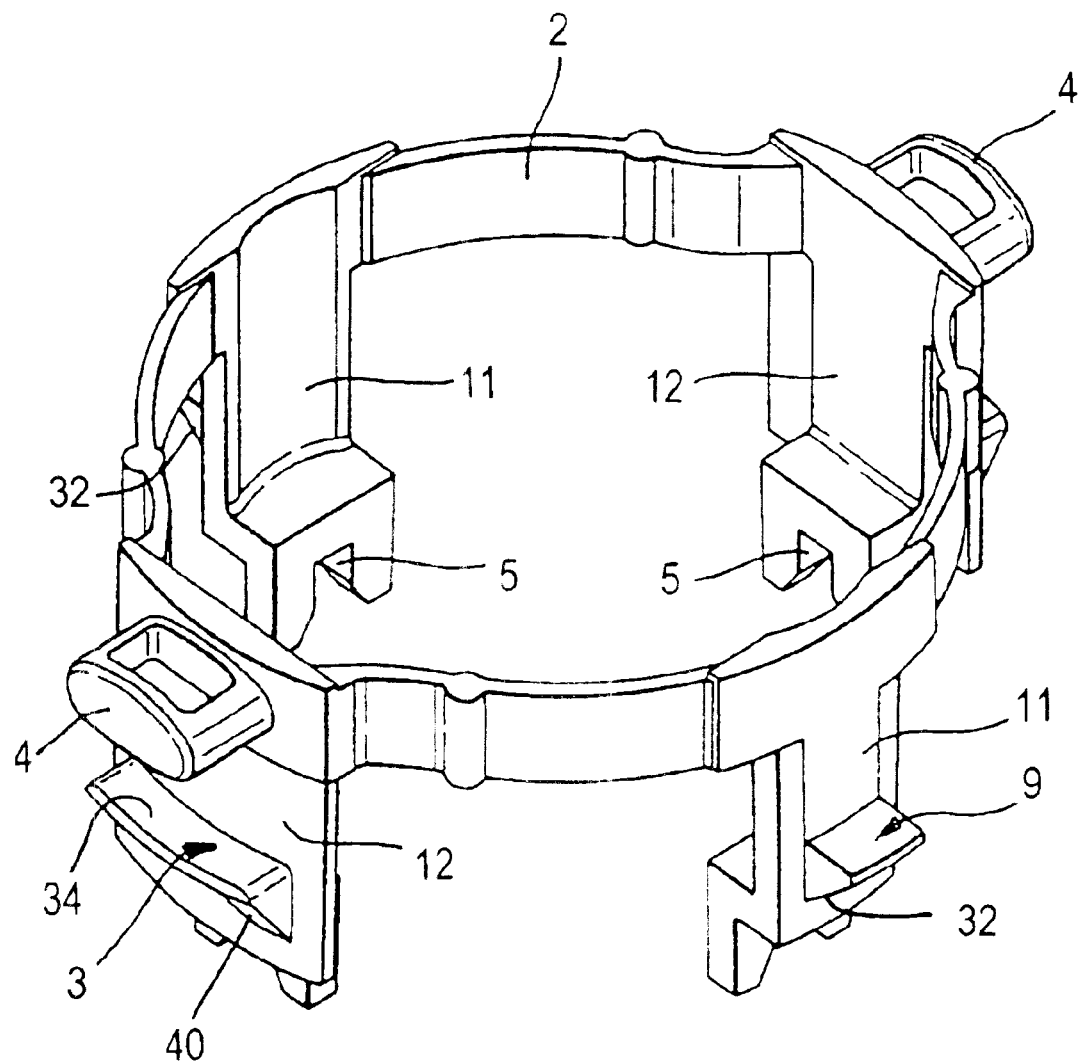
FIG. 3 is a perspective view of the invention spring element of the coupling device of FIG. 1.

According to FIGS. 1 and 3 the connecting bars 12 are integrally formed on the spring element 2 perpendicular to the spring element plane. At their lower ends the connecting bars 12 have perpendicularly extending guide grooves 5, as is particularly well visible in FIG. 3.

Furthermore, in FIGS. 1 and 3 provision is made at the fastening point of the connecting bars 12 above the locking elements 3 for diametrically opposed actuating devices 4 which are equally integrally formed on the spring element 2 as a one-piece construction. In this arrangement the actuating devices 4 are configured as bead-type pushbuttons which, according to FIG. 1, project out of the coupling section of the drive part 7 through an opening 13. To prevent soiling of the drive part 7, provision is made for flexible rubber seals 14 which cover the openings 13 and the actuating devices 4. The spring element 2 is held in its position by guide ribs 8 and the annular collar 17 on the housing 18 of the drive part 7. The guide grooves 5 shown in FIG. 3 slide on the guide ribs 8 when the locking device is actuated.

FIG. 2 shows the same embodiment as FIG. 1, but the section extends in a 90-degree offset relation and some parts are omitted for the sake of simplicity. Shown in FIG. 2 are the ejectors 9 arranged in a 90-degree offset relation to the locking elements 3. The ejectors are connected equally in a one-piece construction to the spring element 2 by way of connecting bars 11 (see FIG. 3) and are slightly wedge-shaped, forming on their bottom sides ramp surfaces 32 which engage abutment surfaces 33 of the tool shank 6 and which, when pressure is applied from both sides radially from without to within against the actuating devices 4 (see the direction of the arrow X in FIG. 1) cause the ejectors 9 to move radially outwardly precisely in the reverse direction, pushing the tool shank of FIG. 2 downward via the abutment surfaces 33, which however is not shown in the drawings because only the assembled position of the tool shank 6 and the drive part 2 is shown. As this occurs, the locking elements 3 have already moved radially inwardly out of the depressions 38 and released the tool shank 3 for axial movement. At their lower ends the connecting bars 11 also have guide grooves 5 which are guided in radial direction by guide ribs 8 in that they embrace said ribs from above and the side. The ejectors 9 are shown in a perspective view in FIG. 3.

The spring element 2 shown in FIG. 3 as an individual part is injection molded as an integral piece manufactured from an elastic thermoplastic material. The spring element 2 of an annular shape, and the actuating devices 4 and the locking elements 3 fitted underneath to a connecting bar 12 are arranged at an angle of 90 degrees to the connecting bars 11 on which the ejectors 9 and the downwardly open guide grooves 5 are formed. The locking elements 3 are arranged on a connecting bar 12 which has the guide grooves 5 further below.

FIG. 4 and FIG. 4a show a schematic functional view of the coupling device of the invention, in which the spring element 2 accommodated in the drive part 7 is shown as a broken line. In FIG. 4 the tool shank 6 is shown in the locked state. In this state the actuating devices 4 are at their furthest apart. By contrast, the ejectors 9 are arranged opposite each other at a shorter relative distance. This becomes also apparent from the greatly simplified sketch in FIG. 4a, which shows a schematic plan view of a rhombic spring element 2.

FIGS. 5 and 5a show a second schematic functional view in which the actuating devices 4 of FIGS. 4 and 4a have been actuated in the direction of the arrow A. As the result, the rhombic spring element 2 deforms such that the locking elements 3 are unlocked and the ejectors 9 separate the tool shank 6 from the drive part 7. This can be seen particularly well in the schematic plan view of the rhombic spring element 2 in FIG. 5a. In the actuated position the ejectors 9 are situated on the long diagonal of the rhombus, while the actuating devices 4 are to be found on the short diagonal. The locking devices 3 fully disappear in the drive part, as becomes apparent from FIG. 5.

What is claimed is:

1. A coupling device for an appliance for domestic use, in particular a handheld blender or immersion blender, for connecting a drive part to a tool shank, with a locking device having at least one locking element being arranged on a coupling section of the drive part, said locking element being in engagement with a detent element of the tool shank in the locked state,
    characterized in that said locking device is constructed as an annular spring element and that in the area of the locking element provision is made for an actuating device causing, when actuated, the spring element to be deformed elastically such that the locking element becomes disengaged from the detent element.

2. The coupling device according to claim 1, wherein the spring element has two diametrically opposed locking elements, and wherein corresponding detent elements are provided on the tool shank.

3. The coupling device according to claim 2,
    characterized in that the locking elements are arranged on first connecting bars integrally connected with the spring element.

4. The coupling device according to claim 2,
    characterized in that the locking elements are of a wedge-shaped configuration and the detent elements are in the form of depressions with horizontally extending walls abutting the abutment surfaces of the locking elements and with obliquely outwardly extending centering surfaces abutting sliding surfaces of the locking elements, the sliding surfaces shaped to conform to the centering surfaces.

5. The coupling device according to claim 1, characterized in that on the outer wall of the coupling section of the drive part provision is made for at least one opening through which the actuating device projects outwardly in the locked state.

6. The coupling device according to claim 5, comprising two actuating devices diametrically opposed on the spring element and projecting out through corresponding openings provided on the drive part.

7. The coupling device according to claim 6, characterized in that the actuating devices are formed on the spring element level with the locking elements.

8. The coupling device according to claim 1, characterized in that the locking device is fabricated from a suitable thermoplastic material.

9. The coupling device according to claim 1, characterized in that the locking device includes at least one ejector disposed in a 90-degree offset relation to the locking element.

10. The coupling device according to claim 9, characterized in that diametrically opposed on the spring element is one ejector each and that the ejectors include ramp surfaces cooperating with corresponding abutment surfaces on the tool shank.

11. The coupling device according to claim 9, characterized in that the locking device includes a captivating device comprised of the ejector formed on the spring element, said ejector in turn engaging within a passage formed on the drive part.

12. The coupling device according to claim 9, characterized in that the ejectors are arranged on second connecting bars which are integrally formed with the spring element.

13. The coupling device according to claim 1, characterized in that on the locking device and in the coupling section of the drive part provision is made for corresponding guide devices guiding the spring element radially towards the drive part.

* * * * *